United States Patent
Chen et al.

(10) Patent No.: US 10,282,439 B2
(45) Date of Patent: May 7, 2019

(54) STORING AND QUERYING MULTIDIMENSIONAL DATA USING FIRST AND SECOND INDICIES

(71) Applicant: INTERNATIONAL BUSINESS MACHINES CORPORATION, Armonk, NY (US)

(72) Inventors: Xiao Yan Chen, Beijing (CN); Yao Liang Chen, Shanghai (CN); Sheng Huang, Shanghai (CN); Kai Liu, Beijing (CN); Wei Lu, Beijing (CN); Xiao Min Xu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 408 days.

(21) Appl. No.: 14/713,635

(22) Filed: May 15, 2015

(65) Prior Publication Data
US 2015/0347479 A1     Dec. 3, 2015

(30) Foreign Application Priority Data

May 28, 2014 (CN) .......................... 2014 1 0231415

(51) Int. Cl.
*G06F 17/30*     (2006.01)
(52) U.S. Cl.
CPC .... *G06F 17/30333* (2013.01); *G06F 17/3028* (2013.01); *G06F 17/30244* (2013.01); *G06F 17/30477* (2013.01); *G06F 17/30492* (2013.01)
(58) Field of Classification Search
CPC ......... G06F 17/30244; G06F 17/30247; G06F 17/3028; G06F 17/30333; G06F 17/30477
(Continued)

(56) References Cited

U.S. PATENT DOCUMENTS 5,890,151 A * 3/1999 Agrawal ........... G06F 17/30324
7,185,023 B2    2/2007 Kothuri
(Continued)

FOREIGN PATENT DOCUMENTS

CN    101241511 A    8/2008
CN    102169494 A    8/2011
(Continued)

OTHER PUBLICATIONS

List of IBM Patents or Patent Applications Treated as Related; CN920140048US1, Date Filed: May 15, 2015, pp. 1-2.
(Continued)

*Primary Examiner* — Hanh B Thai
(74) *Attorney, Agent, or Firm* — Cantor Colburn LLP; Vazken Alexanian

(57) ABSTRACT

The present disclosure relates to methods and systems for storing and querying data. According to the embodiments of the present invention, two-layer indexes are created for multi-dimension data, wherein the primary index is created based on two or more dimensions to retrieve respective data units of the data, while the secondary index is created based on specific dimensions to retrieve respective data blocks in the data unit. Correspondingly, when receiving a multi-dimension query request for data, the primary retrieval first determines a data unit including the target data based on a primary index, and then the secondary retrieval quickly locates a data block including the target data based on the secondary index. In this way, the multi-dimension retrieval can be efficiently performed. Moreover, by appropriately setting the size of a smallest data block, the I/O efficiency of data access will be significantly enhanced.

6 Claims, 7 Drawing Sheets

(58) Field of Classification Search
USPC .................................... 707/743, 803, 741
See application file for complete search history.

(56) References Cited

U.S. PATENT DOCUMENTS

| | | | |
|---|---|---|---|
| 7,386,561 B1 | 6/2008 | Ramesh et al. | |
| 8,396,325 B1* | 3/2013 | Kwatra | G06T 7/33 |
| | | | 382/284 |
| 8,543,579 B2 | 9/2013 | Chen et al. | |
| 9,275,131 B2 | 3/2016 | Rao et al. | |
| 2006/0155679 A1 | 7/2006 | Kothuri et al. | |
| 2008/0181513 A1* | 7/2008 | Almeida | G06F 17/30247 |
| | | | 382/224 |
| 2009/0060345 A1* | 3/2009 | Wheeler | G01S 17/89 |
| | | | 382/195 |
| 2013/0117255 A1* | 5/2013 | Liu | G06F 17/30592 |
| | | | 707/714 |
| 2014/0317086 A1* | 10/2014 | James | G06F 17/30442 |
| | | | 707/715 |
| 2014/0324874 A1* | 10/2014 | Konik | G06F 17/30631 |
| | | | 707/741 |

FOREIGN PATENT DOCUMENTS

| | | |
|---|---|---|
| CN | 102609530 A | 7/2012 |
| CN | 103714175 A | 4/2014 |

OTHER PUBLICATIONS

Xiao Yan Chen, et al, " Storing and Querying Multidimensional Data Using First and Second Indicies," U.S. Appl. No. 14/747,318, Date Filed: Jun. 23, 2015.

H.Kriegel et al.," Efficient spatial query processing in Geographic database systems," IEEE Data Engineering Bulletin, Mar. 1993, pp. 1-6.

J.Ni et al.," PA-Tree: A parametric indexing scheme for spatia temporal trajectories," Advances in Spatial and Temporal Databases Lecture Notes in Computer Science vol. 3633, 2005, pp. 1-19.

T.Tzouramanis et al.," Processing of spatiotemporal queries in image databases," Proceedings of the third eat european conference on advances in databases and inforamtion systems ADBIS, 1999, pp. 1-13.

HouPing, "Multi-temporal Remote Sensing Image Organization Technology Based on Event Triggered Ground State Correction Model," China Excellent Master's Thesis Full-text Database Information Technology Series, Phase S2, pp. I140-1281 (English abstract).

* cited by examiner

STORING AND QUERYING MULTIDIMENSIONAL DATA USING FIRST AND SECOND INDICIES

FOREIGN PRIORITY

This application claims priority to Chinese Patent Application No. 201410231415.X, filed May 28, 2014, and all the benefits accruing therefrom under 35 U.S.C. § 119, the contents of which in its entirety are herein incorporated by reference.

BACKGROUND

Embodiments of the present invention generally relate to the field of databases, and more specifically, to methods and systems for storing and querying data.

Storage and query for data, especially mass data, are of significant importance for database. In recent years, with the development of relevant fields such as science and computation, this issue becomes particularly prominent. As an example, various kinds of satellites may shoot images of one or more areas of the earth or other target object, for various purposes such as scientific research, remote sensing survey, and weather report. Satellite image data has considerable data amount and may be continuously captured and stored within a period of time. Moreover, such data is generally associated with different dimensions. For example, the data of a satellite image at least may be associated with time dimension and spatial dimension. The time dimension may indicate the time or period when the image is captured, while the spatial dimension may indicate the scope of the geographical area included in the image, e.g., limited by latitude coordinate and longitude coordinate.

Multi-dimensional data such as satellite image data poses a great challenge to storage and query of data. A larger data amount results in that the data always has to be distributed in a great number of files, which increases maintenance overheads. Moreover, query of such data is always a multi-dimensional query. In other words, a data query request includes a query condition involving multiple different dimensions, which increases the difficulty and complexity of data query. Moreover, such query process always requires a considerable number of input/output (I/O) operations, which inevitably dampens query efficiency and prolongs response delay.

A traditional solution for data storage and query cannot perform storage and query effectively. For example, a known file system cannot support an effective multi-dimensional query and cannot guarantee I/O efficiency. A relational database based on a "relation-entity" model cannot effectively store multi-dimensional data. Although a database specific for mass data (e.g., scientific array data) has been proposed, such database can only solve the storage issue of data. Multi-dimensional query of multi-dimensional data is still limited by lower efficiency.

In view of the above, there is a need for a solution that can store and query multi-dimensional data more effectively.

SUMMARY

In one embodiment, a method for storing data, the data at least associated with a first dimension and a second dimension, includes creating a primary index for retrieving a data unit of the data at least based on the first dimension and the second dimension; creating a secondary index for retrieving data blocks in the data unit at least based on the first dimension; and storing the data in association with the primary index and the secondary index.

In another embodiment, a method for querying data, the data at least associated with a first dimension and a second dimension, includes receiving a query request for target data, the query request including a first query condition associated with the first dimension and a second query condition associated with the second dimension; retrieving a target data unit including the target data in the data based on the first query condition, the second query condition and a primary index for the data, the primary index created at least based on the first dimension and the second dimension for retrieving data units of the data; and retrieving a target data block including the target data in the target data unit based on the first query condition and a secondary index of the target data unit, as a response to the request, the secondary index created at least based on the first dimension for retrieving data blocks in the data units of the data.

In another embodiment, a system for storing data, the data at least associated with a first dimension and a second dimension includes a primary index creating unit configured to create a primary index for retrieving a data unit of the data at least based on the first dimension and the second dimension; a secondary index creating unit configured to create a secondary index for retrieving data blocks in the data unit at least based on the first dimension; and a storage control unit configured to store the data in association with the primary index and the secondary index.

In another embodiment, a system for querying data, the data at least associated with a first dimension and a second dimension, includes a query receiving unit configured to receive a query request for target data, the query request including a first query condition associated with the first dimension and a second query condition associated with the second dimension; a primary retrieving unit configured to retrieve a target data unit including the target data in the data based on the first query condition, the second query condition and a primary index for the data, the primary index created at least based on the first dimension and the second dimension for retrieving data units of the data; and a secondary retrieving unit configured to retrieve a target data block including the target data in the target data unit based on the first query condition and a secondary index of the target data unit, as a response to the request, the secondary index created at least based on the first dimension for retrieving data blocks in the data units of the data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals are used to represent same or similar elements.

DETAILED DESCRIPTION

Figure 1:
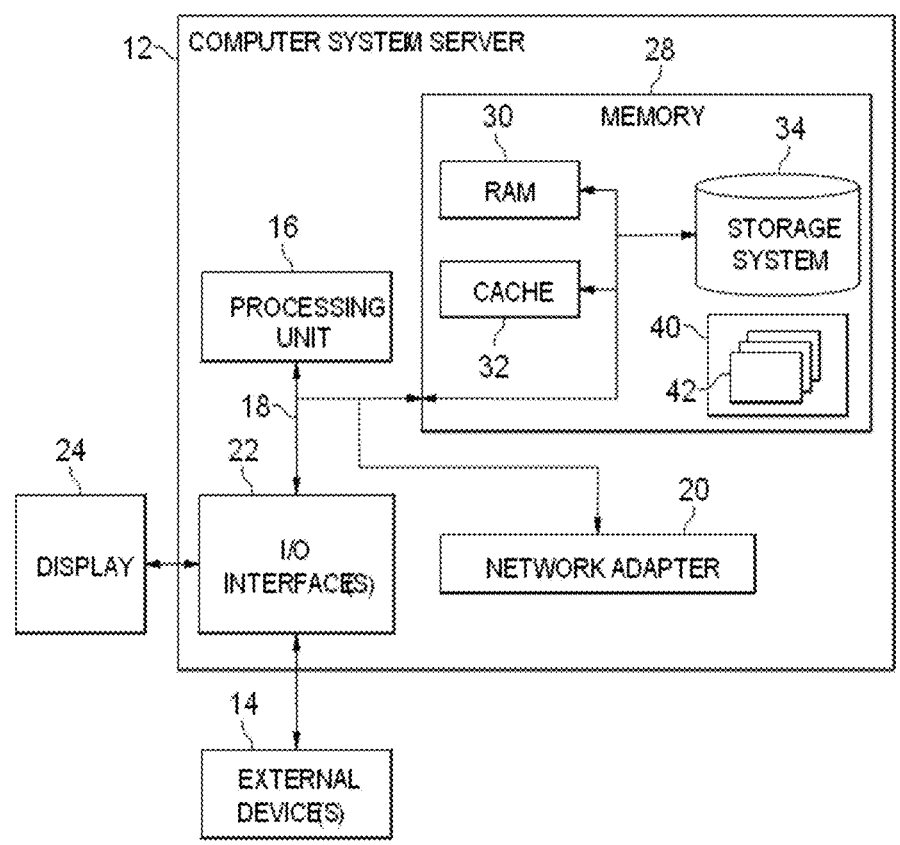
FIG. 1 shows an exemplary computer system/server which is applicable to implement embodiments of the present invention.

In general, embodiments of the present invention provide a solution for storing and querying multi-dimensional data.

In one aspect, embodiments of the present invention provide a technical solution for storing data. One embodiment in this aspect provides a method for storing data, where the data is at least associated with a first dimension and a second dimension. The method comprises: creating a primary index for retrieving a data unit of the data at least based on the first dimension and the second dimension; creating a secondary index for retrieving data blocks in the data unit at least based on the first dimension; and storing the data in association with the primary index and the secondary index.

Another embodiment in this aspect provides a system for storing data, where the data is at least associated with a first dimension and a second dimension. The system comprises: a primary index creating unit configured to create a primary index for retrieving a data unit of the data at least based on the first dimension and the second dimension; a secondary index creating unit configured to create a secondary index for retrieving data blocks in the data unit at least based on the first dimension; and a storage control unit configured to store the data in association with the primary index and the secondary index.

In another aspect, embodiments of the present invention provide a technical solution for querying data. One embodiment in this aspect provides a method for querying data, where the data is at least associated with a first dimension and a second dimension. The method comprises: receiving a query request for target data, the query request including a first query condition associated with the first dimension and a second query condition associated with the second dimension; retrieving a target data unit including the target data in the data based on the first query condition, the second query condition and a primary index for the data, the primary index created at least based on the first dimension and the second dimension for retrieving data units of the data; and retrieving a target data block including the target data in the target data unit based on the first query condition and a secondary index of the target data unit, as a response to the request, the secondary index created at least based on the first dimension for retrieving data blocks in the data units of the data.

Another embodiment in this aspect provides a system for querying data, where the data is at least associated with a first dimension and a second dimension. The system comprises: a query receiving unit configured to receive a query request for target data, the query request including a first query condition associated with the first dimension and a second query condition associated with the second dimension; a primary retrieving unit configured to retrieve a target data unit including the target data in the data based on the first query condition, the second query condition and a primary index for the data, the primary index created at least based on the first dimension and the second dimension for retrieving data units of the data; and a secondary retrieving unit configured to retrieve a target data block including the target data in the target data unit based on the first query condition and a secondary index of the target data unit, as a response to the request, the secondary index created at least based on the first dimension for retrieving data blocks in the data units of the data.

It will be understood through the depiction below that according to the embodiments of the present invention, two-tier indexes are created for multi-dimensional data, wherein the primary index is created based on two or more dimensions to retrieve respective data units of the data, while the secondary index is created based on one or more specific dimensions to retrieve respective data blocks in the data unit. Accordingly, when receiving a multi-dimensional query request for data, the retrieval may also be performed in two layers, wherein the primary retrieval first determines a data unit including the target data based on a primary index, and then the secondary retrieval quickly locates a data block including the target data based on the secondary index. In this way, the multi-dimensional retrieval can be efficiently performed. Moreover, by appropriately setting the size of a smallest data block, the I/O efficiency of data access will be significantly enhanced. Other features and advantages of the present invention will become more comprehensible through the description below.

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Referring now to FIG. 1, an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the depiction of exemplary embodiments, the term "comprise" and its similar expressions indicate an open inclusion, i.e., "include, but not limited to." The term "or" indicates "and/or," unless otherwise defined in the context. The term "based on" indicates "at least in part based on." The term "one embodiment" or "the embodiment" indicates "at least one embodiment."

Hereinafter, the embodiments of the present invention will be described in detail. According to the embodiments of the present invention, two-layer indexes are created for multi-dimensional data, wherein the primary index is for retrieving respective data units of the data, while the secondary index is used to retrieve respective data blocks in the data unit. Accordingly, upon reception of a multi-dimensional query request for the data, target data may be quickly located and returned in two-layer retrievals based on the two-layer indexes.

Generally, embodiments of the present invention are applicable for storing and querying multi-dimensional data. Here, the term "multi-dimensional data" refers to data associated with more than one dimension. Additionally, according to the embodiments of the present invention, the multi-dimensional data is organized by data units. Examples of multi-dimensional data include, but not limited to, satellite image data. In this case, one satellite image is a data unit. The data of each image is at least associated with spatial and time dimensions. For example, in time dimension, the image data may have a timestamp, for indicating the time or period when the image is captured. In spatial dimension, the image data is associated with the geographical area included in the image. In one embodiment, the scope of geographical area, for example, may be represented through latitude and longitude coordinates. Of course, the satellite image data may also be associated with more dimensions. For example, in one embodiment, an additional dimension is a wavelength of light when the image is captured.

Figure 2:
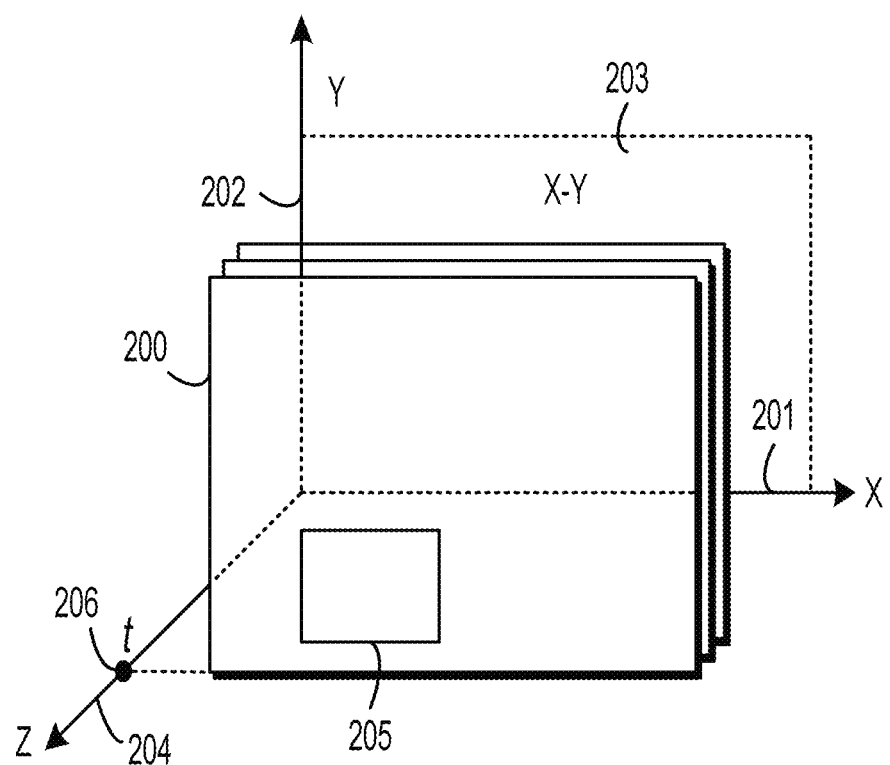
FIG. 2 shows a schematic diagram of multi-dimensional data on which embodiments of the present invention may be applied.

FIG. 2 shows a schematic diagram of multi-dimensional data according to one exemplary embodiment of the present invention. Only for the sake of discussion, in the example of FIG. 2, a data unit is one or more satellite images 200, which is associated with spatial dimension and time dimension. As shown in FIG. 2, X-axis 202 represents latitude, and Y-axis 202 represents longitude. Therefore, the plane X-Y 203 defined by X-axis and Y-axis define the spatial dimension of the data unit 200. Z-axis 204 represents time, which defines time dimension of the data unit 200. In the query, what is desired to query by the user may be data in the specific geographical area 205 at time 206. It should be noted that although the area 205 is shown in a regular shape in FIG. 2, it is only schematic. In practice, a to-be-queried target area may be of any shape.

Please note that in the depiction infra, some embodiments will be described with reference to a satellite image data at least associated with time dimension and spatial dimension. However, it should be understood that it is only for the purpose of explanation and illustration, not intended to limit the scope of the present invention in any manner. The embodiments of the present invention are suitable for any data associated with more than one dimension.

Figure 3:
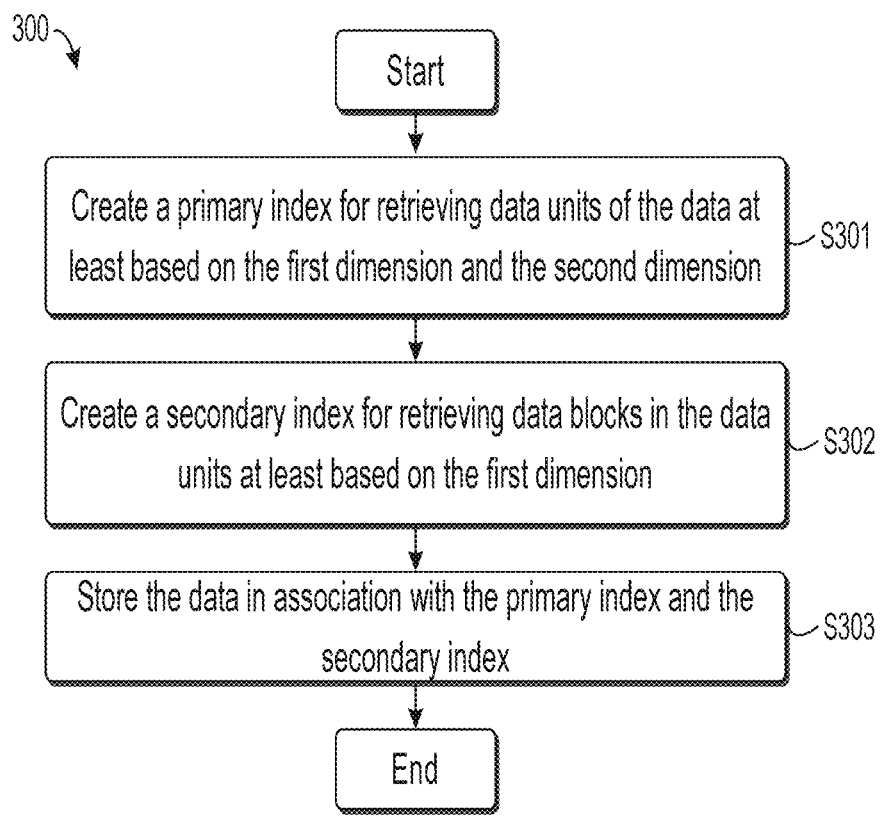
FIG. 3 shows a schematic flow diagram of a method for storing multi-dimensional data according to embodiments of the present invention.

Referring to FIG. 3, in which a flow diagram of a method 300 for storing data according to one embodiment of the present invention is presented. At operation S301, a primary index for data is created at least based on two dimensions (denoted as first and second dimensions) associated with multi-dimensional data. The primary index will be used to retrieve respective data units of the data.

It should be understood that although in the following depiction, the primary index is created based on two dimensions, it is only exemplary. Based on actual application scenarios and needs, the primary dimension for the data may be created based on more dimensions. The scope of the present invention is not limited in this aspect.

According to the embodiments of the present invention, the primary index for the data may be created using any appropriate technology. For example, in one embodiment, the primary index may be implemented as an R-tree. As known, R-tree is a spatial index structure, wherein each node may be associated with a range r1 of the first dimension and a range r2 of the second dimension. If a node is not a leaf node, the range of the first dimension and the range of the second dimension associated with any one of its sub-nodes fall within r1 and r2, respectively, and so on and so forth.

Besides the ranges of the first and second dimensions, the leaf nodes may also store information capable of locating relevant data units.

With the satellite image data as an example, suppose the first dimension is a spatial dimension, and the second dimension is a time dimension. Correspondingly, each node in the R-tree may be associated with the range of latitude and longitude as well as the time range. For example, in one embodiment, a node of the R-tree may be associated with a triple <LoR, LaR, t>, wherein LoR represents the latitude range of a geographical area, LaR represents a dimension range of the geographical area, and t represents time range of the captured image. In particular, a leaf node of the R-tree also has information about the storage location of the image, e.g., the primary key value of the image data in the database.

It should be understood that implementing the primary index using R-tree is only exemplary, not intended to limit the scope of the present invention in any manner. Any currently known or future developed index structure may be used to implement the primary index. For example, in some other embodiments, a primary index for data may be created using structures such as R+ tree, spatial network, etc. The scope of the present invention is not limited in this aspect.

Next, at operation S302, for each data unit, a secondary index is created at least based on a specific dimension (e.g., first dimension), for retrieving data blocks in the data unit. For example, when the data unit is a satellite image, the secondary index may be created based on the spatial dimension, so as to retrieve one or more image blocks in the image.

It should be understood that although the secondary index is depicted to be created based on one specific dimension infra, it is only exemplary. According to the actual application scenarios and needs, multiple secondary indexes for data units may be created based on multiple dimensions, respectively. The scope of the present invention will not be limited in this aspect.

Figure 4:
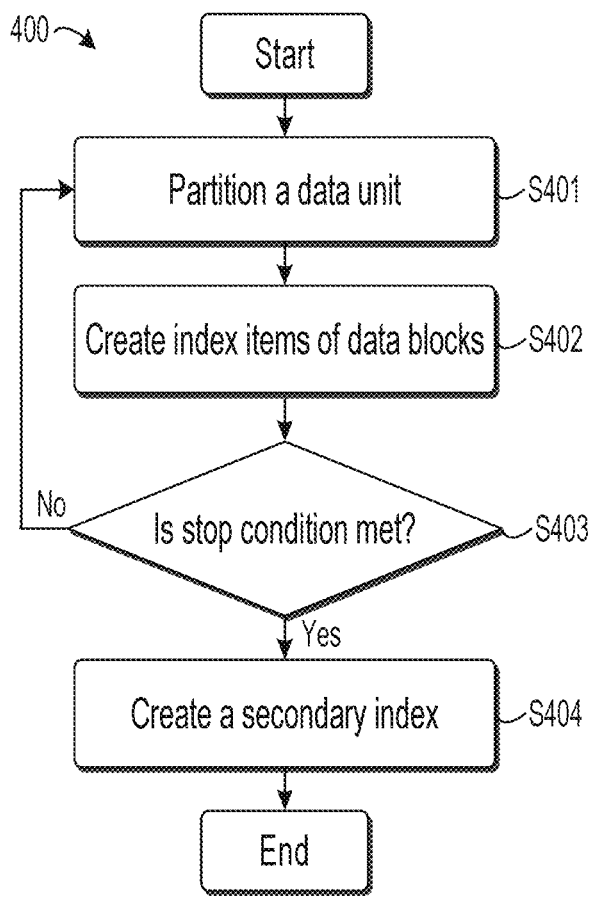
FIG. 4 shows a schematic flow diagram of a method for creating a secondary index through iteratively partitioning data according to embodiments of the present invention.

In some embodiments, a secondary index for the data unit may be created by iteratively partitioning the data unit. FIG. 4 shows a flow diagram of a method 400 for creating a secondary index based on iterative data partitioning according to one embodiment of the present invention. It would be understood that method 400 is an exemplary implementation of the operation S302 of the method 300.

As shown in FIG. 4, at operation S401, a data unit is partitioned with respect to a first dimension, to obtain a plurality of data blocks. The partitioning may be performed according to any predefined rule. In particular, in some embodiments, the data unit may be divided equally, such that each data unit resulting from the partitioning has the same data size. For example, for the satellite image, in each iteration, the image may be partitioned into equally sized image blocks in spatial dimension. A specific example in this aspect will be further described in detail infra.

Next, at operation S402, for any data block obtained through data partitioning, an index item in the secondary index for the data block is created based on a range of the data block in the first dimension. For example, for each image block obtained through image partitioning, the ranges of latitude and longitude of the geographical area corresponding to the image block may be used as the secondary index items of the image block.

Then, at operation S403, whether a predefined partitioning stop condition is met. If it is determined that the stop condition has not been met (branch "No"), the method 400 returns to operation S401 to continue to a next round of partitioning with respect to the data in the data unit, and repeating creation (operation S402) of index item and determination (operation S403) of the stop condition. Otherwise, if it is determined at operation S403 that the stop condition has been met (branch "Yes"), the method 400 proceeds to operation S404 to create a secondary index for the data unit based on the created index items of respective data blocks.

According to the embodiments of the present invention, at operation S403, any appropriate partitioning stop condition may be used. For example, in some embodiments, the stop condition may be the numbers of partitioning the data unit. Namely, once the data unit has been iteratively partitioned with respect to the first dimension for predetermined times, the partitioning will stop. Alternatively or additionally, in some embodiments, data size of the data block may be used as a stop condition. For example, in an embodiment of iteratively partitioning the data equally, the data blocks resulting from each partitioning have an identical data size. Based on the comparison between the size of data block and the predetermined threshold, it is determined to continue or stop partitioning the data unit. In one example, the predetermined threshold may be determined based on the block size on the storage medium for storing data.

Specifically, in this embodiment, after each iteration, the size of the partitioned data block is compared with the block size of the storage medium. If the size of data block matches the size of storage medium (e.g., equal or approximately equal), the partitioning may stop; otherwise, partitioning the data blocks continues. In this way, the data block resulting from the last partitioning (called "smallest data block") has a data size matching the size of the storage block. In this way, when the data is stored on the storage medium, each smallest data block is basically stored in one storage block. In this way, I/O efficiency when accessing data can be significantly enhanced. Therefore, the present invention is advantageous.

At operation S404, the index item created at operation S402 may be organized using any appropriate index structure, thereby forming a secondary index of the data unit. For example, in some embodiments, a $K^2$ tree may be used to create a secondary index. For example, for a satellite image, each non-leaf sub-node of the $K^2$ tree is associated with corresponding ranges of latitude and longitude, and the ranges of latitude and longitude of all sub-nodes of the node fall within the ranges of latitude and longitude of the parent node, and so on and so forth. In particular, a leaf node of the $K^2$ tree corresponding to the ranges of the latitude and longitude of the smallest image block resulting from the partitioning process, and has information of storage location of the corresponding smallest image block. For example, in one embodiment, the leaf sub-node may have a pointer directed to a storage block that stores a corresponding image block.

It should be understood that implementing the secondary index using the $K^2$ tree is only exemplary, not intended to limit the scope of the present invention in any way. Any currently known or future developed index structure may be used to implement the secondary index. For example, in some embodiments, a KD tree may be used to implement the secondary index.

Figure 5:
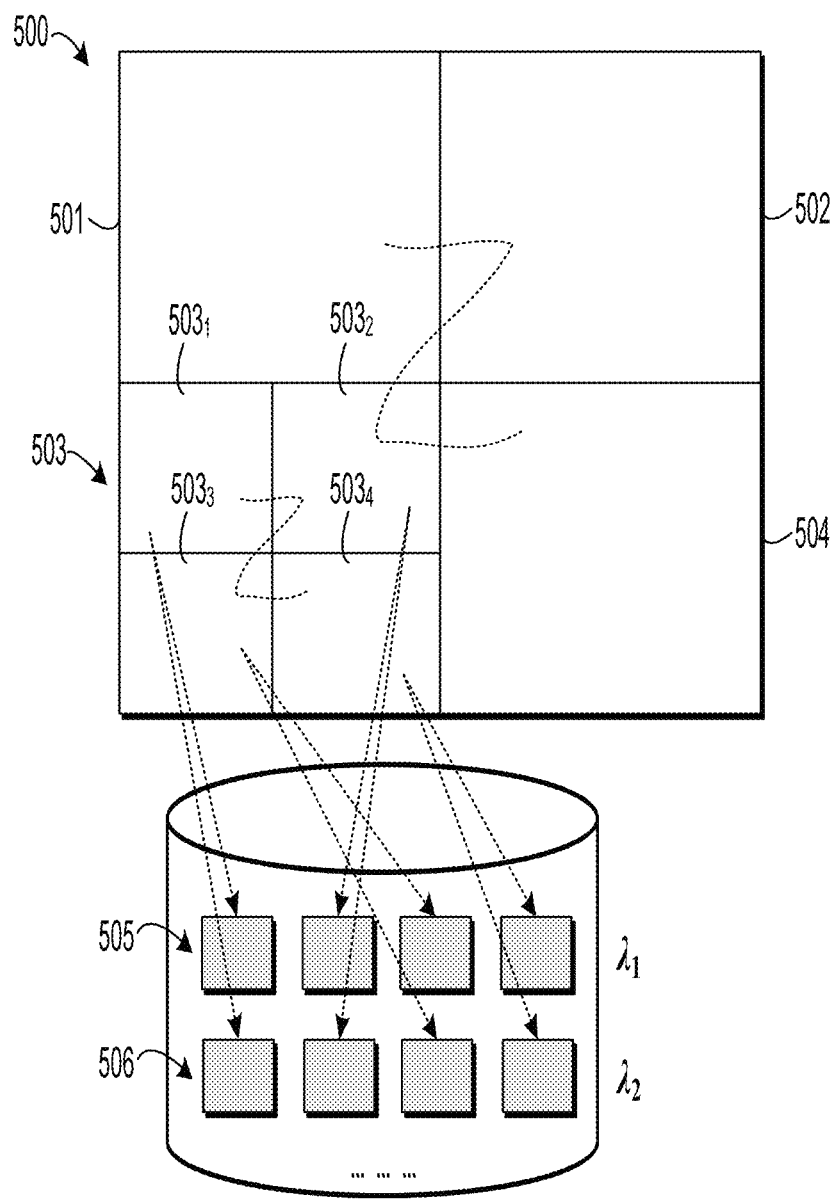
FIG. 5 shows a schematic diagram of iterative partition and data storage in creating a secondary index according to embodiments of the present invention.

FIG. 5 shows an example of performing method 400 to a satellite image. In this example, the data unit is an image 500 of a specific geographical area captured by satellite, and the secondary index is created with respect to spatial dimension, wherein the spatial dimension is expressed by ranges of latitude and longitude. According to method 400, the image 500 is equally divided into four parts in each round of partitioning according to the latitude and longitude coordinates. For example, in the first round of partitioning, the image 500 is divided into four image blocks 501-504 according to the middle value of its latitude and longitude. The index item of each of the image blocks 501-504 is created based on the ranges of latitude and longitude of the image block.

In the example shown in FIG. 5, the stop condition for data partitioning is that the data size of the image block matches the size of the storage block on the storage medium. If this condition is met, stop data partitioning. Otherwise, continue iteratively partitioning image blocks 501-504. For the sake of clarity, FIG. 5 only shows four smaller image blocks 5031-5034 resulting from a second round of partitioning to the image block 503. For each of the 5031-5034, an index item is likewise created based on the ranges of the latitude and longitude of its corresponding geographical area.

Suppose the stop condition is met after two rounds of partitioning. In other words, the data size of the image blocks 5031-5034 matches the size of the storage block. In this case, data partitioning stops. The image blocks 5031-5034 are just the smallest data blocks. In particular, in this example, each smallest data block may be stored in a storage block.

Referring again to FIG. 3, the method 300 proceeds to operation S303, where the data is stored in association with the primary index created at operation S301 and the secondary index created at operation S302. For example, in the embodiment in which the primary index is implemented as an R-tree, a leaf node of the R-tree has information of storage location of a corresponding data unit. In the embodiment in which the secondary index is implemented as a $K^2$-tree, an index item associated with the smallest data block (i.e., the leaf node in the $K^2$ tree) has information of the storage location of the smallest data block (e.g., a pointer directed to a corresponding storage block).

In order to enhance retrieving efficiency, in some embodiments, data may be stored at least based on a proximity relationship of the data blocks in the first dimension for creating the secondary index. For the sake of discussion, still consider the example of FIG. 5, when storing data, based on the proximity relationship of the image block in spatial dimension, data of respective image blocks may be stored continuously in Z-order. For example, in one embodiment, the image blocks 501-504 are continuously stored in Z-order. The sub-blocks included in each image block are continuously stored recursively in Z-order. For example, in the image block 503, sub-blocks 5031-5034 are likewise continuously stored in Z-order.

In particular, in the example shown in FIG. 5, besides the first dimension (space) and the second dimension (time), the image data is also associated with an additional dimension, i.e., wavelength (λ) of the light when the image is captured. Therefore, continuity of the image data in the wavelength dimension may also be considered. Specifically, in one embodiment, image data associated with the same wavelength may be continuously stored. As shown in FIG. 5, storage blocks in row 505 are used for storing image data associated with a first wavelength (λ1), and storage blocks in row 506 are used for storing image data associated with a second wavelength (λ2), and so on and so forth.

By performing method 200, the primary index based on multiple dimensions (e.g., first dimension and second dimension) and the primary index for retrieving a data unit are created. Moreover, a secondary index based on a specific dimension (e.g., first dimension) is created for retrieving a data block in the data unit. In this way, the efficiency of multi-dimensional data query can be significantly enhanced.

Figure 6:
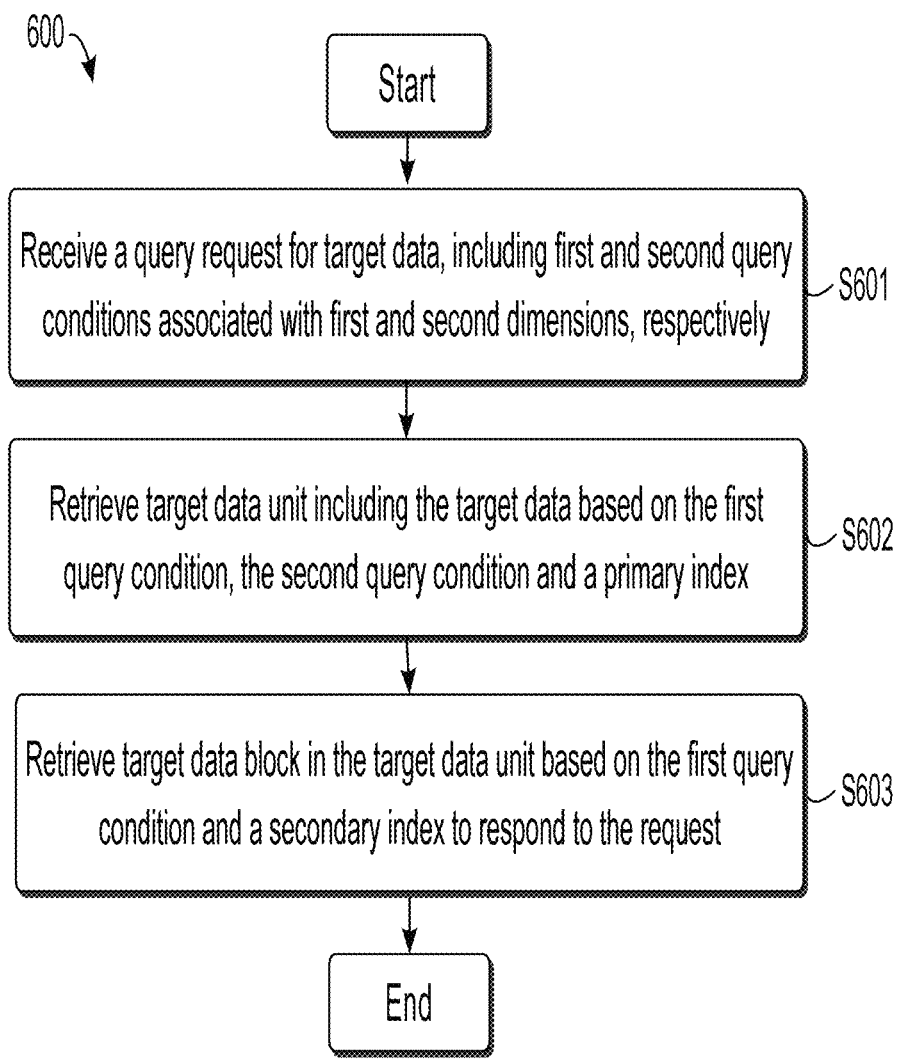
FIG. 6 shows a schematic flow diagram of a method for querying multi-dimensional data according to embodiments of the present invention.

FIG. 6 shows a flow diagram of a method 600 for querying multi-dimensional data according to one embodiment of the present invention.

At operation S601, a query request for target data is received. In particular, according to the embodiments of the present invention, the query request may include query conditions associated with different dimensions. For example, the query request at least may include a first query condition associated with a first dimension, and a second query condition associated with a second dimension.

With the satellite image data as an example, the first dimension may be a spatial dimension, and the second dimension may be a time dimension. The query request may query data of a satellite image of a specific geographical area captured at a particular time or within a particular time range. Therefore, the first query condition, for example, indicates a range of the geographical area by virtue of latitude and longitude coordinates. Particularly, a to-be-queried geographical area may have a regular shape (e.g., rectangle), or any irregular shape (e.g., "Beijing City"). Meanwhile the second query condition indicates the time or time range when the to-be-queried data.

In response to a query request, at operation S602, a data unit (called "target data unit") including to-be-queried target data in the data is retrieved based on a first query condition, a second query condition and a primary index of data. As mentioned above, the primary index is created at least based on a first dimension and a second dimension. By retrieving the primary index, one or more target data units meeting the first query condition and the second query condition may be determined. With satellite image data as an example, the primary index (e.g., R-tree) of the image data may be retrieved using the time range and geographical area range designated in the query request, thereby determining one or more target images including the designated geographical area and captured within the designated time.

Then, at operation S603, for each target data unit determined at operation S602, one or more target data blocks including the target data is retrieved based on the first query condition associated with the first dimension and the second index of the target data unit. For example, in some embodiments, the secondary index of the satellite image is created based on spatial dimension (ranges of latitude and longitude). Correspondingly, an image block including to-be-queried geographical area is retrieved using a query condition about spatial dimension in the query request according to the secondary index, thereby responding to the query request.

Similar to the process of creating a secondary index, the process of retrieving a target data block in a target data unit may be implemented through iterative partitioning. Specifically, in some embodiments, iterative partitioning may be performed by a target data unit in a first dimension. For each data block obtained in each partitioning, as mentioned above, the secondary index item associated therewith indicates a range of the data block in the first dimension. Therefore, the range of the first dimension as indicated in the secondary index item may be compared with the query range of the first dimension as designated in the first query condition to determine whether the data block at least in part matches the first query condition.

Still with reference to the satellite image as an example, through query the primary index, one or more target images including a to-be-queried geographical area and captured at the designated time or within the designated time range may be obtained at operation S602. At operation S603, for any target image, it is iteratively partitioned in the spatial dimension. For example, in some embodiments, the image may be iteratively partitioned into four equal parts according to the ranges of latitude and longitude. For each image block resulting from the partition, a corresponding index item in the secondary index (e.g., $K^2$ tree) saves the range of the geographical area corresponding to the image block. If the range at least in part overlaps with the query range designated in the first query condition, continue partitioning and processing the image block. Otherwise, if the range of the geographical area represented by the image block does not intersect with the query range designated in the first query condition, this image block will be excluded from the subsequent processing.

In this way, by iteratively partitioning the target data unit, those smallest data blocks including the to-be-queried data may be finally determined. As mentioned above, the secondary index item (e.g., the leaf node in the $K^2$ tree) of the smallest data block indicates its storage location (e.g., a pointer directed to the storage block). Therefore, these target data blocks may be accessed and returned as a response to the query request. In particular, as mentioned above, in some embodiments, the size of the smallest data block may match the size of the storage block. Therefore, the I/O access in the smallest data block may be efficiently performed with storage block as a unit. Moreover, in some embodiments, the smallest data blocks may be continuously stored according to its proximity relationship in the first dimension. In this way, when accessing the target data, the I/O access to the storage medium may be performed continuously without a need of frequently jumping between different storage blocks. Therefore, the I/O efficiency can be significantly enhanced and the response time can be significantly reduced.

Figure 7:
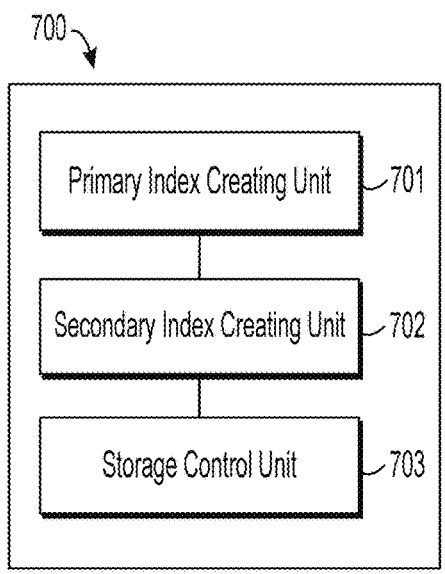
FIG. 7 shows a schematic block diagram of a system for storing multi-dimensional data according to embodiments of the present invention.

FIG. 7 shows an exemplary block diagram of a system 700 for storing data according to the embodiments of the present invention. The data is at least associated with the first dimension and the second dimension. As shown in the figure, the system comprises: a primary index creating unit 701 configured to create a primary index for retrieving a data unit of the data at least based on the first dimension and the second dimension; a secondary index creating unit 702 configured to create a secondary index for retrieving data blocks in the data unit at least based on the first dimension; and a storage control unit 703 configured to store the data in association with the primary index and the secondary index.

In some embodiments, the secondary index creating unit 702 may comprise: a data portioning unit configured to iteratively partition the data unit in the first dimension, till a predetermined stop condition is met; and a secondary index item creating unit configured to create, for a data block obtained by partitioning the data unit, an index item of the data block in the secondary index based on a range of the data block in the first dimension.

In some embodiments, the data partitioning unit is configured to iteratively partition the data unit equally in the first dimension. In such an embodiment, the stop condition comprises: a size of a data block obtained by partitioning the data matches a size of a storage block on a storage medium for storing the data.

In some embodiments, the storage control unit 703 may be configured to store the data at least based on a proximity relationship of the data blocks in the first dimension.

Figure 8:
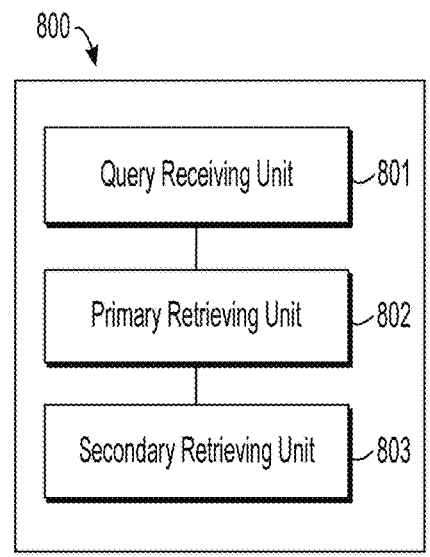
FIG. 8 shows a schematic block diagram of a system for querying multi-dimensional data according to embodiments of the present invention.

FIG. 8 shows a block diagram of a system 800 for querying data according to one embodiment of the present invention. The data is at least associated with a first dimension and a second dimension. As shown in the figure, the system 800 comprises: a query receiving unit 801 configured to receive a query request for target data, the query request including a first query condition associated with the first dimension and a second query condition associated with the second dimension; a primary retrieving unit 802 configured to retrieve a target data unit including the target data in the data based on the first query condition, the second query condition and a primary index for the data, the primary index created at least based on the first dimension and the second dimension for retrieving data units of the data; and a secondary retrieving unit 803 configured to retrieve a target data block including the target data in the target data unit based on the first query condition and a secondary index of the target data unit, as a response to the request, the secondary index created at least based on the first dimension for retrieving data blocks in the data units of the data.

In some embodiments, the secondary retrieving unit 803 may comprise: a target data partitioning unit configured to iteratively partition the target data unit in the first dimension; and a data block comparing unit configured to determine, for a data block obtained by partitioning the target data unit, whether the data block at least in part matches the first query condition based on the first query condition and the secondary index. In some embodiments, the target data partitioning unit is configured to iteratively partition the target data unit equally in the first dimension.

It should be noted that for the sake of clarity, FIGS. 7 and 8 do not show optional units or sub-units included in the systems 700 and 800. All features and operations as described above are suitable for the systems 700 and 800, respectively, which are therefore not detailed here. Moreover, partitioning of units or subunits in the systems 700 and 800 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the systems 700 and 800 may be implemented by various manners, including software, hardware, firmware or a random combination thereof. For example, in some embodiments, the apparatus may be implemented by software and/or firmware. Alternatively or additionally, the systems 700 and 800 may be implemented partially or completely based on hardware, for example, one or more units in the systems 700 and 800 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A hardware-implemented system for storing satellite image data within a non-transitory storage medium, the data at least associated with a first dimension and a second dimension, the system comprising:
a primary index creating unit configured to create a primary index for retrieving a data unit of the satellite image data at least based on the first dimension and the second dimension, wherein the first dimension corresponds to a spatial dimension, the spatial dimension comprises a range of latitude and a range of longitude, and the second dimension corresponds to a time dimension;

a secondary index creating unit configured to create a secondary index for retrieving data blocks in the data unit at least based on the first dimension; and a storage control unit configured to store the data in association with the primary index and the secondary index, wherein the secondary index creating unit comprises a data portioning unit configured to iteratively partition the data unit in the first dimension until a predetermined stop condition is met, wherein the stop condition comprises: a size of a data block obtained by the last partitioning of the data matches a size of a storage block on the storage medium for storing the data, and the satellite image data is partitioned into equally sized data blocks in the spatial dimension such that each data block can be individually stored in a corresponding storage block on the storage medium.

2. The system of claim 1, wherein the secondary index creating unit comprises:

a secondary index item creating unit configured to create, for a data block obtained by partitioning the data unit, an index item of the data block in the secondary index based on a range of the data block in the first dimension.

3. The system of claim 2, wherein the data partitioning unit is configured to iteratively partition the data unit equally in the first dimension.

4. The system of claim 1, wherein the storage control unit is configured to store the data at least based on a proximity relationship of the data blocks in the first dimension.

5. A hardware-implemented system for querying satellite image data that is stored within a non-transitory storage medium, the data at least associated with a first dimension and a second dimension, the system comprising:

a query receiving unit configured to receive a query request for target data, the query request including a first query condition associated with the first dimension and a second query condition associated with the second dimension;

a primary retrieving unit configured to retrieve a target data unit including the target data in the satellite image data based on the first query condition, the second query condition and a primary index for the data, the primary index created at least based on the first dimension and the second dimension for retrieving data units of the data, wherein the first dimension corresponds to a spatial dimension, the spatial dimension comprises a range of latitude and a range of longitude, and the second dimension corresponds to a time dimension;

a secondary retrieving unit configured to retrieve a target data block including the target data in the target data unit based on the first query condition and a secondary index of the target data unit, as a response to the request, the secondary index created at least based on the first dimension for retrieving data blocks in the data units of the data, wherein the secondary retrieving unit comprises a target data partitioning unit configured to iteratively partition the target data unit in the first dimension, wherein the target data partitioning unit is configured to iteratively partition the target data unit equally in the first dimension until a predetermined stop condition is met, and the stop condition comprises a size of a data block obtained by the last partitioning of the data matches a size of a storage block on the storage medium for storing the data, and the satellite image data is partitioned into equally sized data blocks in the spatial dimension such that each data block is individually stored in a corresponding storage block on the storage medium.

6. The system of claim 5, wherein the secondary retrieving unit comprises:

a data block comparing unit configured to determine, for a data block obtained by partitioning the target data unit, whether the data block at least in part matches the first query condition based on the first query condition and the secondary index.

* * * * *